(12) United States Patent
Iwabuchi

(10) Patent No.: US 11,335,047 B2
(45) Date of Patent: May 17, 2022

(54) INFORMATION DISPLAY APPARATUS, METHOD FOR CONTROLLING INFORMATION DISPLAY APPARATUS, AND STORAGE MEDIUM

(71) Applicant: CANON KABUSHIKI KAISHA, Tokyo (JP)

(72) Inventor: Kohei Iwabuchi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/944,226

(22) Filed: Jul. 31, 2020

(65) Prior Publication Data
US 2021/0042977 A1 Feb. 11, 2021

(30) Foreign Application Priority Data
Aug. 9, 2019 (JP) .............................. JP2019-147963

(51) Int. Cl.
*G06T 11/60* (2006.01)
*G06T 7/00* (2017.01)
*G06T 11/00* (2006.01)

(52) U.S. Cl.
CPC ............ *G06T 11/60* (2013.01); *G06T 7/0002* (2013.01); *G06T 11/001* (2013.01); *G06T 2207/20081* (2013.01); *G06T 2207/30188* (2013.01)

(58) Field of Classification Search
CPC ......... G06T 11/60; G06T 1/20; G06T 11/206; G06T 2215/12; G06T 2207/30188; G06N 3/04; G06N 3/08; G06K 9/00657; G06Q 50/02; A01M 1/026
See application file for complete search history.

(56) References Cited

U.S. PATENT DOCUMENTS

| 10,386,540 B2 | 8/2019 | Sato | |
|---|---|---|---|
| 2020/0396976 A1* | 12/2020 | Aronov | ................... A01G 7/00 |
| 2021/0042977 A1* | 2/2021 | Iwabuchi | .............. G06T 11/206 |

FOREIGN PATENT DOCUMENTS

JP 2018109580 A 7/2018

* cited by examiner

*Primary Examiner* — Todd Buttram
(74) *Attorney, Agent, or Firm* — Rossi, Kimms & McDowell LLP

(57) ABSTRACT

An apparatus comprises a unit that acquires observation data indicating an observation value representing a state of a crop, the observation value being associated with any of a plurality of observation types representing types of observation objects, the observation value being obtained by observing a crop; and a control unit that visualizes and displays the observation value at a position on a map where the observation has been performed, the observation value being indicated by the acquired observation data, wherein when displaying the observation values simultaneously or in a switchable manner, in a case where the control unit visualizes the observation value exceeding or less than a predetermined value specified for each of the plurality of observation types, it visualizes and displays the observation value on the map by using an identical display form for each of the plurality of observation types.

20 Claims, 9 Drawing Sheets

| | 301 | 1011 | 302 | 303 | 304 | 305 |
|---|---|---|---|---|---|---|
| 1010 | ID | TASK ID | OBSERVATION DATE | COORDINATE | OBSERVATION TYPE | OBSERVATION VALUE |
| | 1 | 1 | 2019/2/1 | (x1, y1) | POWDERY MILDEW | 0.35 |
| | 2 | 1 | 2019/2/1 | (x2, y2) | POWDERY MILDEW | 0.32 |
| | 3 | 1 | 2019/2/1 | (x3, y3) | POWDERY MILDEW | 0.36 |
| | 4 | 2 | 2019/2/15 | (x1', y1') | POWDERY MILDEW | 0.27 |
| | 5 | 2 | 2019/2/15 | (x2', y2') | POWDERY MILDEW | 0.25 |
| | 6 | 2 | 2019/2/15 | (x3', y3') | POWDERY MILDEW | 0.26 |

FIG. 3

| ID | OBSERVATION DATE | COORDINATE | OBSERVATION TYPE | OBSERVATION VALUE |
|---|---|---|---|---|
| 1 | 2019/2/1 | (x1, y1) | POWDERY MILDEW | 0.35 |
| 2 | 2019/2/3 | (x2, y2) | SUGAR CONTENT | 8 |
| 3 | 2019/2/7 | (x3, y3) | BUDS | 112 |
| 4 | 2019/3/3 | (x4, y4) | SUGAR CONTENT | 13 |
| 5 | 2019/3/8 | (x5, y5) | BUDS | 128 |
| 6 | 2019/3/14 | (x6, y6) | POWDERY MILDEW | 0.29 |

FIG. 4

| ID | OBSERVATION TYPE | UPPER LIMIT VALUE | LOWER LIMIT VALUE |
|---|---|---|---|
| 1 | POWDERY MILDEW | 0.6 | — |
| 2 | SUGAR CONTENT | 15 | 7 |

FIG. 5

| ATTENTION DEGREE SECTION | VISUALIZATION PARAMETER |
|---|---|
| $x == 0$ | RED |
| $0.25 > x > 0$ | ORANGE |
| $0.50 > x >= 0.25$ | YELLOW |
| $0.75 > x >= 0.5$ | YELLOW-GREEN |
| $x >= 0.75$ | GREEN |

F I G. 10A

| | ID | DATE | TASK TYPE |
|---|---|---|---|
| | 1 | 2019/2/1 | POWDERY MILDEW SURVEY |
| | 2 | 2019/2/15 | POWDERY MILDEW SURVEY |
| | 3 | 2019/4/6 | SUGAR CONTENT SURVEY |
| | 4 | 2019/4/13 | SUGAR CONTENT SURVEY |

F I G. 10B

| ID | TASK ID | OBSERVATION DATE | COORDINATE | OBSERVATION TYPE | OBSERVATION VALUE |
|---|---|---|---|---|---|
| 1 | 1 | 2019/2/1 | (x1, y1) | POWDERY MILDEW | 0.35 |
| 2 | 1 | 2019/2/1 | (x2, y2) | POWDERY MILDEW | 0.32 |
| 3 | 1 | 2019/2/1 | (x3, y3) | POWDERY MILDEW | 0.36 |
| 4 | 2 | 2019/2/15 | (x1', y1') | POWDERY MILDEW | 0.27 |
| 5 | 2 | 2019/2/15 | (x2', y2') | POWDERY MILDEW | 0.25 |
| 6 | 2 | 2019/2/15 | (x3', y3') | POWDERY MILDEW | 0.26 |

INFORMATION DISPLAY APPARATUS, METHOD FOR CONTROLLING INFORMATION DISPLAY APPARATUS, AND STORAGE MEDIUM

BACKGROUND OF THE INVENTION

Field of the Invention

The present invention relates to an information display apparatus, a method for controlling an information display apparatus, and a storage medium, and particularly relates to a technology for visualizing data obtained by observation of an agricultural crop.

Description of the Related Art

In the field of agriculture, a decision is made regarding the growth of a crop by observing the crop over a certain period of time and visualizing obtained observation results on a map.

In a case where a crop exhibiting a symptom of disease and pest is found within a field, data representing occurrence of the disease is input in association with coordinates at which the crop is present. The data collected in this manner is visualized on a map to formulate a countermeasure plan such as spraying of an agricultural chemical in an area where observation results representing the disease are concentrated. However, in a case where observation results representing the disease are present in a plurality of areas within the field, it is difficult to determine which of the areas may be prioritized.

In Japanese Patent Laid-Open No. 2018-109580, a UV index representing the intensity of ultraviolet light is measured, and data is displayed at a measurement position. At this time, the color of the data is set to be closer to red as the UV index increases. In addition, conventionally, a method for visualizing weather data includes indicating, on a map, an area with higher precipitation (larger numerical value) in blue and an area with lower precipitation (smaller numerical value) in red. In the case of temperature, an area with higher temperature (larger numerical value) is indicated in red, whereas an area with lower temperature (larger numerical value) is indicated in blue. The rendering color is determined by using human impression that red is strongly associated with sunlight and heat, whereas blue is strongly associated with water.

In the conventional technology, a method for determining rendering color of data varies for each type of observation item such as temperature and precipitation. Thus, in an environment in which a plurality of types of data can be displayed simultaneously or in a switchable manner, it is difficult to identify, at first glance, data requiring particular attention. Accordingly, there is a problem such as difficulty in easy identification of data of interest from among data visualized on a map.

In view of the above problem, the present invention provides a technology that enables easy identification of data of interest from among data visualized on a map where a plurality of types of observation data can be visualized.

SUMMARY OF THE INVENTION

According to one aspect of the present invention, there is provided an information display apparatus comprising: an acquisition unit configured to acquire observation data indicating an observation value representing a state of a crop, the observation value being associated with any of a plurality of observation types representing types of observation objects, the observation value being obtained by observing a crop; and a display control unit configured to visualize and display the observation value at a position on a map where the observation has been performed, the observation value being indicated by the observation data acquired by the acquisition unit, wherein when the display control unit displays the observation values respectively associated with the plurality of observation types simultaneously or in a switchable manner, in a case where the display control unit visualizes the observation value exceeding or less than a predetermined value specified for each of the plurality of observation types, the display control unit visualizes and displays the observation value on the map by using an identical display form for each of the plurality of observation types.

Further features of the present invention will become apparent from the following description of exemplary embodiments (with reference to the attached drawings).

BRIEF DESCRIPTION OF THE DRAWINGS

FIG. 3 illustrates a table storing observation data according to the first embodiment.

FIG. 4 illustrates a table storing the range of an observation value according to the first embodiment.

FIG. 5 illustrates a table storing a visualization parameter according to the first embodiment.

FIGS. 10A and 10B illustrate a table storing a task and a table storing observation data, according to the second embodiment.

DESCRIPTION OF THE EMBODIMENTS

Figure 1:
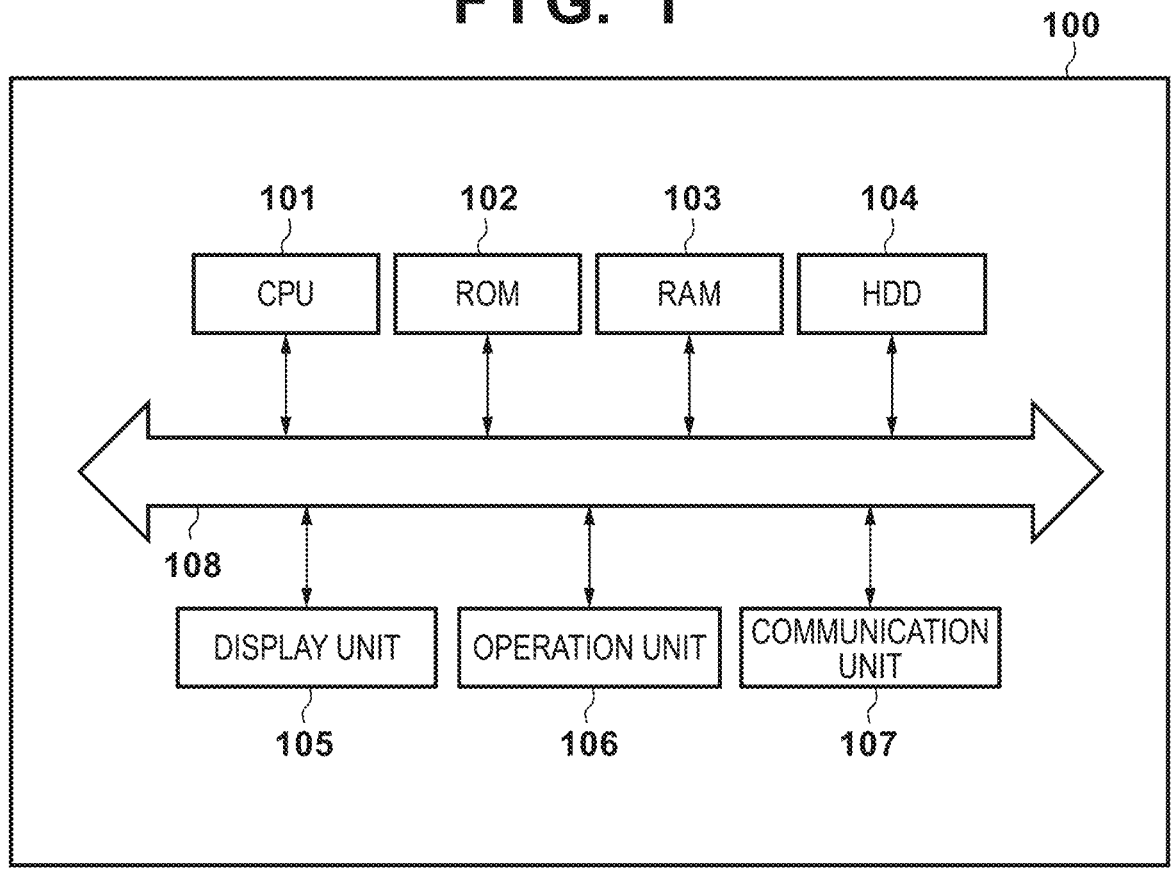
FIG. 1 is a view illustrating an overall configuration of an information display apparatus according to a first embodiment.

Hereinafter, embodiments will be described in detail with reference to the attached drawings. Note, the following embodiments are not intended to limit the scope of the claimed invention, and limitation is not made an invention that requires a combination of all features described in the embodiments. Two or more of the multiple features described in the embodiments may be combined as appropriate. Furthermore, the same reference numerals are given to the same or similar configurations, and redundant description thereof is omitted.

In the present embodiment, an operation of displaying, on a map, observation data acquired through observation of a crop (e.g. grape) will be described as an example. Here, the observation data refers to data including, for example, an observation position representing coordinates in which observation has been performed, an observation type representing a type of observation, and an observation value representing a state of a crop. However, the observation data is not limited to this example, and various modifications may be possible. For example, the observation data may further include the observation date and time.

First Embodiment

Hardware Configuration of Information Display Apparatus

FIG. 1 is a view illustrating a hardware configuration of an information display apparatus 100 according to the present embodiment. As illustrated in FIG. 1, the information display apparatus 100 includes a CPU 101, a ROM 102, a RAM 103, HDD 104, a display unit 105, an operation unit 106, and a communication unit 107. The CPU 101 is a Central Processing Unit and performs computation and logical determination for various types of processing and controls each component connected to a system bus 108. The Read-Only Memory (ROM) 102 is a program memory that stores a program for control by the CPU 101, including various processing procedures described below. The Random Access Memory (RAM) 103 is used as a temporary storage area such as a main memory or a work area for the CPU 101. Note that the program memory may be realized by loading a program into the RAM 103 from an external storage apparatus or the like connected to the information display apparatus 100.

The HDD 104 is a hard disk for storing electronic data and a program according to the present embodiment. An external storage apparatus may be used to serve a similar function. Here, the external storage apparatus can be realized by, for example, a medium (recording medium) and external storage drive for realizing access to the medium. As such a medium, for example, a flexible disk (FD), a CD-ROM, a DVD, a USB memory, a Magneto-Optical (MO) disk, a flash memory, or the like is known. In addition, the external storage apparatus may be a server apparatus or the like connected via a network.

The display unit 105 is, for example, a Cathode Ray Tube (CRT) display, a liquid crystal display, or the like, and is a device that outputs an image to a display screen. Note that the display unit 105 may be an external device wired or wirelessly connected to the information display apparatus 100. The operation unit 106 receives various operations by a user. Note that the operation unit 106 may be an external device (for example, a keyboard, a mouse, or the like) that is wired or wirelessly connected to the information display apparatus 100. In addition, the display unit 105 may include a touch panel to enable various operations to be input via the display unit 105. Thus, the display unit 105 may be provided with the function of the operation unit 106. The communication unit 107 performs wired or wireless bi-directional communication with other information processing apparatuses, communication devices, external storage apparatuses, and the like by known communication technology.

Functional Configuration of Information Display Apparatus

Figure 2:
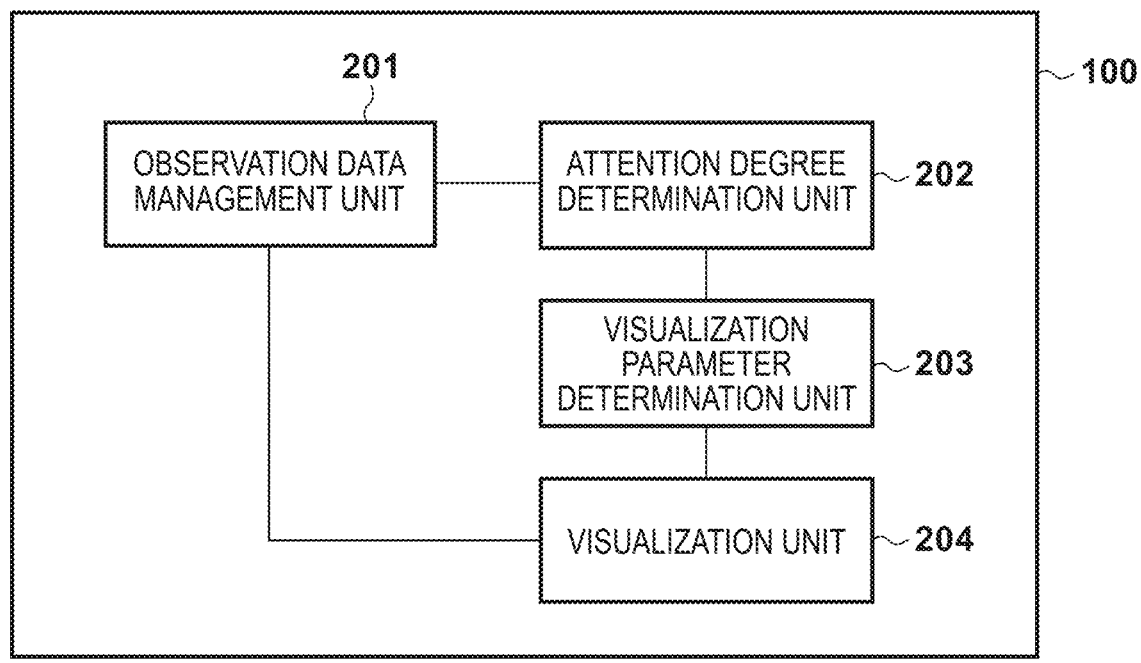
FIG. 2 is a functional block diagram of the information display apparatus according to the first embodiment.

FIG. 2 is a block diagram illustrating an example of a functional configuration of the information display apparatus 100 according to the present embodiment. Each of the functional units can be realized by the CPU 101 expanding, into the RAM 103, a program stored in the ROM 102, and executing processing according to each flowchart described below. The results of execution of each type of processing are then held in the RAM 103. In addition, for example, in a case where hardware is configured as a substitute for software processing using the CPU 101, a computing unit or circuit corresponding to the processing of each of the functional units described here may be configured. The same applies to each functional unit in each of the embodiments described below.

The information display apparatus 101 includes an observation data management unit 201, an attention degree determination unit 202, a visualization parameter determination unit 203, and a visualization unit 204.

The observation data management unit 201 holds and manages observation data in the HDD 104, an external recording apparatus connected via the communication unit 107, or the like. The attention degree determination unit 202 acquires observation data from the observation data management unit 201, and calculates attention degree of the observation data based on an observation type and an observation value in the acquired observation data. Here, the attention degree is an indicator of whether observation data is to be checked with particular attention. More specifically, the attention degree increases in a case where damage by disease and pest is severe, or a crop deviates from standard maturity conditions or grows slower than surrounding crops.

The visualization parameter determination unit 203 determines a visualization parameter from the attention degree of the observation data calculated by the attention degree determination unit 202. Here, the visualization parameter is a parameter for visualizing observation data on a map displayed in a predetermined display area of the display unit 105. For example, observation data is visualized as a small circle (hereinafter referred to as a marker). At this time, rendering color of the marker can be the visualization parameter. Note that the visualization parameter may be a value representing a size of the marker. In addition, for example, a change in attention degree may be represented by deforming a shape of the marker from a graphic pattern to another graphic pattern. At this time, a value representing the degree of deformation of a graphic pattern can be the visualization parameter.

The visualization unit 204 renders observation data on a map displayed in a predetermined display area of the display unit 105, based on an observation position of the observation data and the visualization parameter.

Observation Data Table

FIG. 3 illustrates an observation data table 300 used by the observation data management unit 201 to manage observation data held.

In FIG. 3, in ID 301 of the observation data table 300, ID for uniquely identifying observation data stored in the observation data table 300 is described. In an observation date 302, the date on which observation was performed on a crop is described. In an observation position 303, positional information (coordinates information) regarding a location where observation has been performed on a crop is described.

In an observation type 304, a type of observation performed on a crop is described. Here, in the observation type 304, a value such as "powdery mildew," and "phylloxera," representing a type of disease and pest may be stored. In addition, a value such as "sugar content," and "acidity," that is an indicator representing the maturity of a crop (e.g. grape), and a value such as "buds," and "clusters," on which counting or weighing is performed for yield prediction may be stored. In the present embodiment, at least a plurality of observation types are handled. In an observation value 305, a value representing a state of a crop obtained when the crop was observed.

Observation Value Range Table

FIG. 4 illustrates an observation value range table 400 used to manage the range of an observation value for each observation type and referred to when the attention degree determination unit 202 determines attention degree of observation data.

In FIG. 4, in ID 401 of the observation value range table 400, ID for uniquely identifying the range of an observation value stored in the observation value range table 400 is described. In an observation type 402, an observation type is described. In an upper limit value 403, an upper limit of an observation value is described. In a lower limit value 404, a lower limit of an observation value is described. Note that the upper limit value 403 and the lower limit value 404 may not have corresponding values. That is, only the upper limit value may be set or only the lower limit value may be set.

Visualization Parameter Table

FIG. 5 illustrates a visualization parameter table 500 that is referred to when the visualization parameter determination unit 203 determines a visualization parameter from attention degree.

In an attention degree section 501, each section of attention degree is described. In a visualization parameter 502, a visualization parameter corresponding to the attention degree section 501 is described. In the illustrated example, in a case where attention degree X is 0, a visualization parameter is red, and in a case where the attention degree X is 0.25>X>0, a visualization parameter is orange. In addition, in a case where the attention degree X is 0.50>X≥0.25, a visualization parameter is yellow, and in a case where the attention degree X is 0.75>X≥0.5, a visualization parameter is yellow-green, and in a case where the attention degree X is X≥0.75, a visualization parameter is green.

Processing

Figure 6:
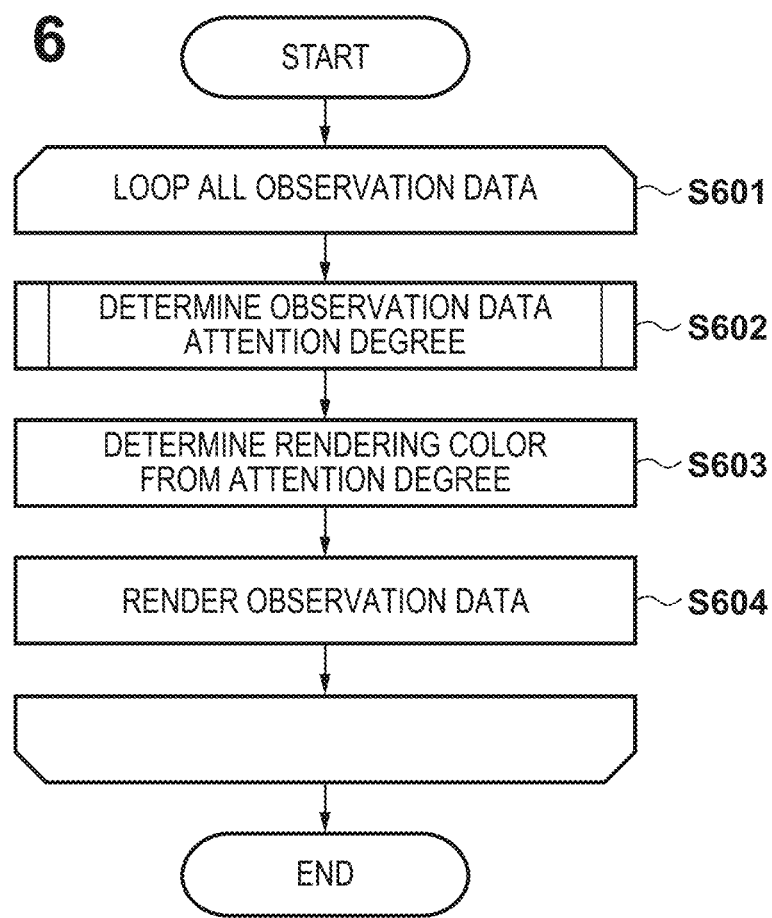
FIG. 6 is a flowchart of main processing according to the first embodiment.

FIG. 6 is a flowchart explaining a flow of the entire processing performed by the information display apparatus 100 according to the present embodiment. Hereinafter, the processing illustrated in the flowchart is realized by the CPU 101 in FIG. 1 executing a program according to the present embodiment. At S601, the CPU 101 acquires all of observation data from the observation data management unit 201, and repeats processing from S602 to S604 for each piece of the observation data.

At S602, the attention degree determination unit 202 calculates attention degrees of the observation data. Details of the present step will be described below with reference to FIG. 8.

At S603, the visualization parameter determination unit 203 determines a visualization parameter based on the attention degree of the observation data calculated at S602. In the present embodiment, the observation data is visualized as a marker, and the visualization parameter is rendering color of the marker. Here, the visualization parameter is acquired with reference to the visualization parameter table 500. Note that, instead of using a lookup table (visualization parameter table 500) to determine the visualization parameter from the attention degree, a function for returning the visualization parameter by using the attention degree as an argument may be used.

At S604, the visualization unit 204 renders the observation data as the marker on a map displayed in a predetermined display area of the display unit 105. A rendering position of the marker is an observation position of the observation data, and as the rendering color of the marker, the visualization parameter determined at S603 is used. As for information other than the visualization parameter that is required for rendering the marker (e.g., a size and a shape of the marker), a constant may be referred to, or a user may set the information.

Figure 7:
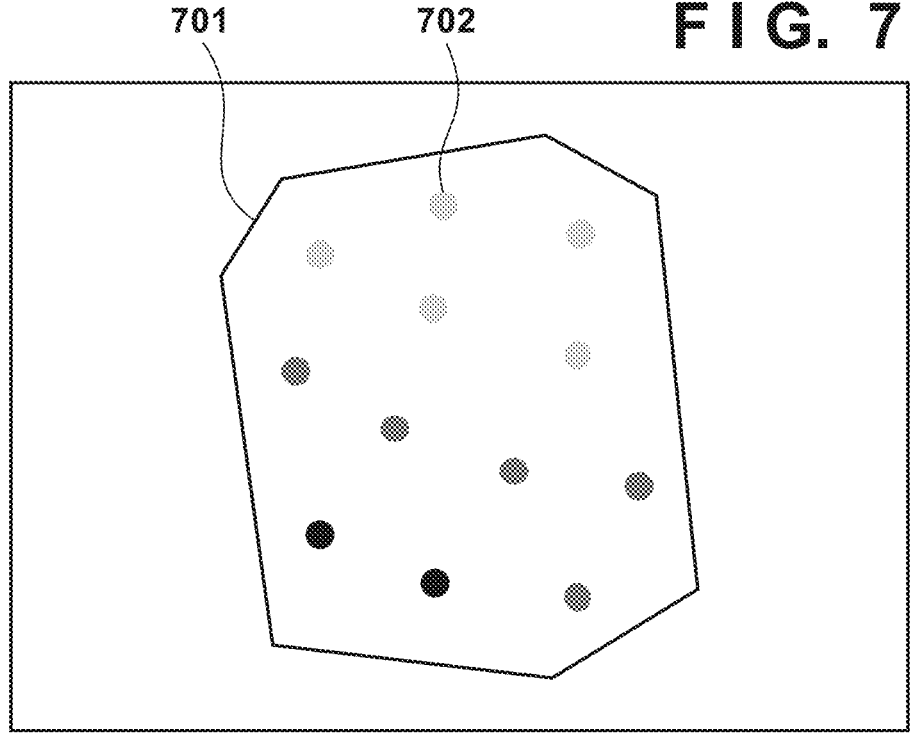
FIG. 7 is an explanatory view illustrating a screen layout of marker display according to the first embodiment.

Here, FIG. 7 is an explanatory view illustrating an example of a screen layout displayed on the display unit 105 when the observation data is rendered as the marker at S604. 701 is a polygon representing a predetermined area within a field. 702 is the marker visualized on the map at S604. In FIG. 7, the visualization parameter has been determined such that color density of the marker increases as the attention degree increases. A user identifies, based on the color density, the marker with high attention degree from among the markers displayed on the map. In the present embodiment, regardless of the observation item of the observation data to be visualized, the rendering colors of the markers are unified. A user can switch the observation items by operation of a Graphical User Interface (GUI) or the like, and the screen in FIG. 7 can be displayed for each observation item, or the observation data of a plurality of the observation items can be visualized simultaneously to express the screen in FIG. 7. Then, in any of the cases, data of interest can be identified easily at the same scale. That is, a quick determination can be made without the need for a conventionally required check on an observation item corresponding to data, and without the need to check a scale (legend of rendering color) each time.

Figure 8:
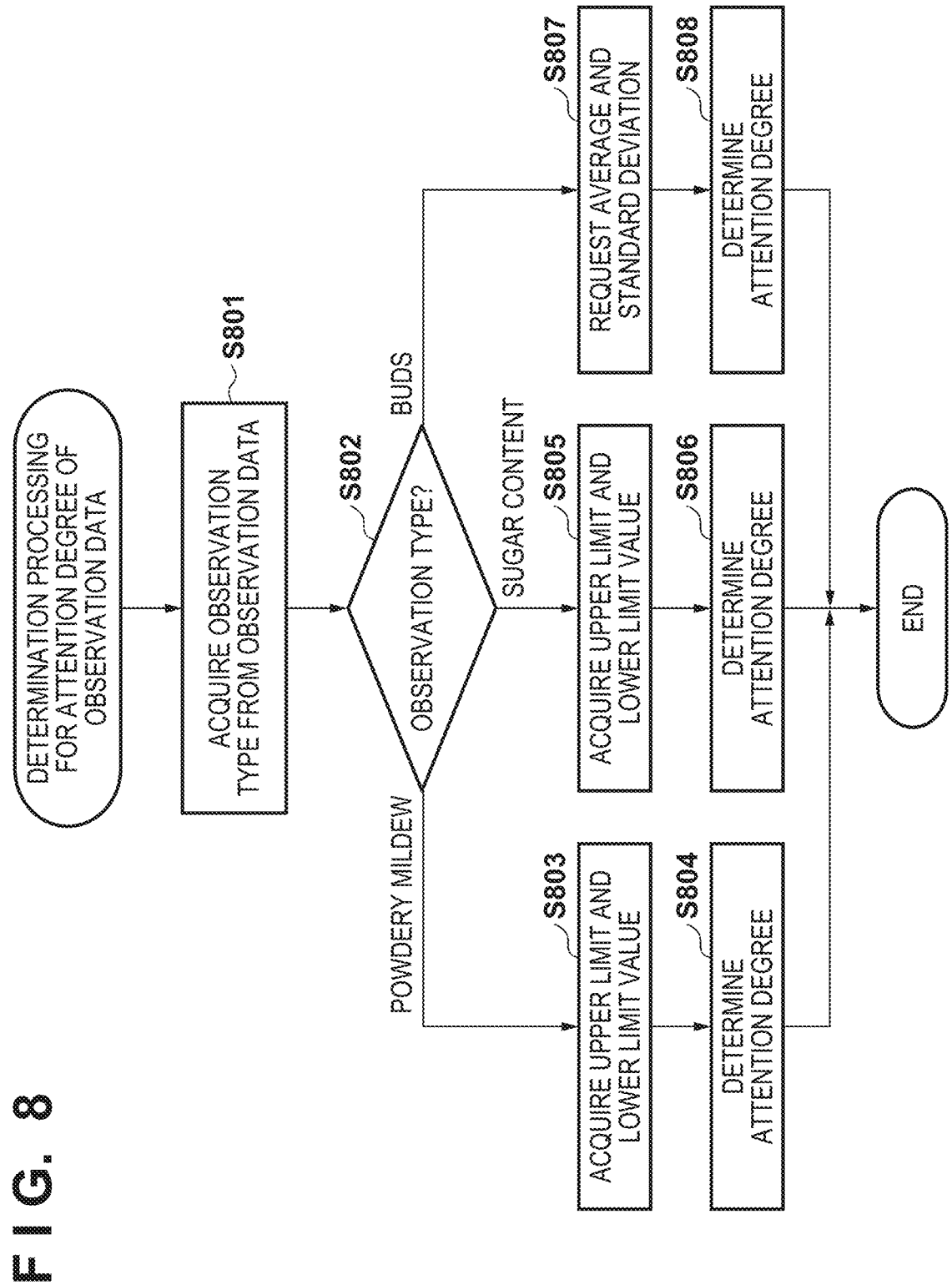
FIG. 8 is a flowchart of attention degree determination processing according to the first embodiment.

FIG. 8 is a flowchart explaining a flow of attention degree determination processing performed by the information display apparatus 100 according to the present embodiment. The processing in the present flowchart is a detailed procedure of the processing at S602.

At S801, the attention degree determination unit 202 acquires an observation type from the observation data. At S802, the attention degree determination unit 202 branches the processing based on the observation type acquired at S801. In the present embodiment, the case where the observation type is "powdery mildew," "sugar content," and "buds" will be described. In a case where the observation type is "powdery mildew," the processing proceeds to S803. In a case where the observation type is "sugar content," the processing proceeds to S805. In a case where the observation type is "buds," the processing proceeds to S807.

S803 to S804 are an example of processing executed in a case where the observation type is "powdery mildew." "Powdery mildew" is a type of disease and pest, and in the observation of the disease and pest, the degree of damage is recorded as an observation value. Here, assuming that more attention needs to be paid to checking as the degree of damage increases, the attention degree is determined such that the attention degree increases as the observation value is closer to a predetermined upper limit value.

At S803, the attention degree determination unit 202 acquires an upper limit value 403 and a lower limit value 404 from the observation value range table 400 by using the observation type as a key. In the example in FIG. 4, an upper limit value for powdery mildew is 0.6 and no lower limit value is present. At S804, the attention degree determination unit 202 acquires the observation value from the observation data, and determines attention degree by using Equation (1). Here, in a case where a value corresponding to the upper limit value 403 or the lower limit value 404 is not present, the value is considered to be 0. In addition, it is assumed that there is no case where the upper limit value 403 and the lower limit value 404 are the same.

[Equation 1]

Attention degree=(Observation value−Lower limit value)/(Upper limit value−Lower limit value) (1)

S805 to S806 are an example of processing executed in a case where the observation type is "sugar content." The "sugar content" is a type of indicator that represents maturity, and the range of standard values for the indicator representing maturity is known. Here, assuming that more attention needs to be paid for a check as the indicator representing maturity deviates more significantly from the range of standard values, the attention degree is determined such that the attention degree increases as the observation value deviates more significantly from a median value of the predetermined range.

At S805, the attention degree determination unit 202 acquires the upper limit value 403 and the lower limit value 404 from the observation value range table 400 by using the observation type as a key. At S806, the attention degree determination unit 202 acquires the observation value from the observation data, and determines attention degree by using Equation (2). Here, μ is a median value between the upper limit value 403 and the lower limit value 404. In addition, in a case where a value corresponding to the upper limit value 403 or the lower limit value 404 is not present, the value is considered to be 0. In addition, it is assumed that there is no case where the upper limit value 403 and the lower limit value 404 are the same.

[Equation 2]

$$\text{Attention degree} = \begin{cases} (\text{Observation value} - \mu)/(\text{Upper limit value} - \mu): \\ \qquad \text{Observation value} \geq \mu \\ (\mu - \text{Observation value})/(\mu - \text{Lower limit value}): \\ \qquad \text{Observation value} < \mu \end{cases} \quad (2)$$

S807 to S808 are an example of processing executed in a case where the observation type is "buds." The "buds" are a type of observation item on which counting or weighing is performed for yield prediction, and an attribute value for a crop used for yield prediction is recorded as an observation value. Here, it is assumed that more attention needs to be paid for a check as the attribute value of a crop used for yield prediction deviates more significantly than attribute values of surrounding crops. In this example, the attention degree is determined such that the attention degree increases as the observation value of the observation data in which the observation type is "buds" deviates more significantly from an average observation value of total observation data in which the observation type is "buds."

At S807, the attention degree determination unit 202 acquires the observation data in which the observation type is "buds" from the observation data management unit 201. Then, an average and a standard deviation are determined for an observation value of the acquired observation data.

At S808, the attention degree determination unit 202 acquires the observation value from the observation data, and determines attention degree by using Equation (3). Here, z in Equation (3) is determined by using Equation (4).

[Equation 3]

$$\text{Attention degree} = \begin{cases} z: 0 \leq z \leq 1 \\ 1: z > 1 \end{cases} \quad (3)$$

[Equation 4]

$$z = |\text{Observation value} - \text{Average}| / \text{Standard Deviation} \quad (4)$$

As described above, in the present embodiment, the attention degree is determined from the observation value based on the observation type, and the observation data is visualized based on the attention degree. Thus, even in a case where observation data obtained for a plurality of different types of observation items is visualized on a map simultaneously or in a switchable manner, observation data of particular interest can be identified easily.

MODIFICATION EXAMPLE 1-1

Note that, instead of the attention degree determination unit 202 in the above-described processing units, a learned model subjected to machine learning may be used for processing. In this case, for example, a plurality of combinations of input data and output data for the processing unit are prepared as learning data, and knowledge is acquired from the plurality of combinations by machine learning. Then, based on the acquired knowledge, a learned model that outputs output data with respect to input data as a result is generated. The learned model can include for example, a neural network model. Then, the learned model performs processing by cooperating with a CPU, a GPU, or the like as a program for performing processing equivalent to the processing by the processing unit. Note that the learned model may be updated after certain processing as necessary.

MODIFICATION EXAMPLE 1-2

Note that, in the case described in the present embodiment, the observation data includes one pair of the observation type and the observation value (hereinafter referred to as observation information) for one observation position, but the observation data may include a plurality of pieces of observation information. In this case, at S801 in FIG. 8 (the step of acquiring an observation type from the observation data), observation information representative of the plurality of pieces of observation information may be selected. Here, to select the representative observation information from the plurality of pieces of observation information, priority may be set for each observation type in advance, and the observation information may be selected according to the priority. In addition, the number of times of appearance of the observation information provided in all observation data may be counted for each observation type, and the priority of the observation type may be determined based on the number of times of the appearance (frequency of appearance). For example, the priority may increase as the number of appearance increases. Then, the attention degree of the observation data may be determined based on the selected representative observation information (observation type and observation value).

MODIFICATION EXAMPLE 1-3

Note that, in the present embodiment, the method for visualizing single piece of observation data is described, but a visualization object may be a group including a plurality of pieces of observation data geographically adjacent to each other. In this case, at S601, processing from S602 to S604 is repeated for single piece of observation data and a group of observation data. In a case where the processing from S602 to S604 is executed for the group of observation data, representative observation data is selected from the group of observation data before the processing from S602 to S604. Then, S602 to S604 may be executed for the selected observation data.

Here, to select the representative observation data from the group of observation data, for example, observation data having the earliest observation date of the group of the observation data may be selected. Alternatively, observation data having the latest observation date may be selected. In addition, the centroid of observation positions of the group of the observation data may be calculated, and observation data closest to the centroid may be selected.

Second Embodiment

In the first embodiment, the attention degree is determined in accordance with the observation type and the observation value in the observation data, the visualization parameter is determined from the attention degree, and the observation data is then visualized on the map. In contrast, in an example described in a second embodiment, a chronological change in attention degree is focused on, and observation data is visualized based on a change in attention degree having occurred since the last performed observation activity until the current time.

A hardware configuration of an information display apparatus according to the present embodiment is similar to the hardware configuration of the information display apparatus 100 described in the first embodiment.

Functional Configuration of Information Display Apparatus

Figure 9:
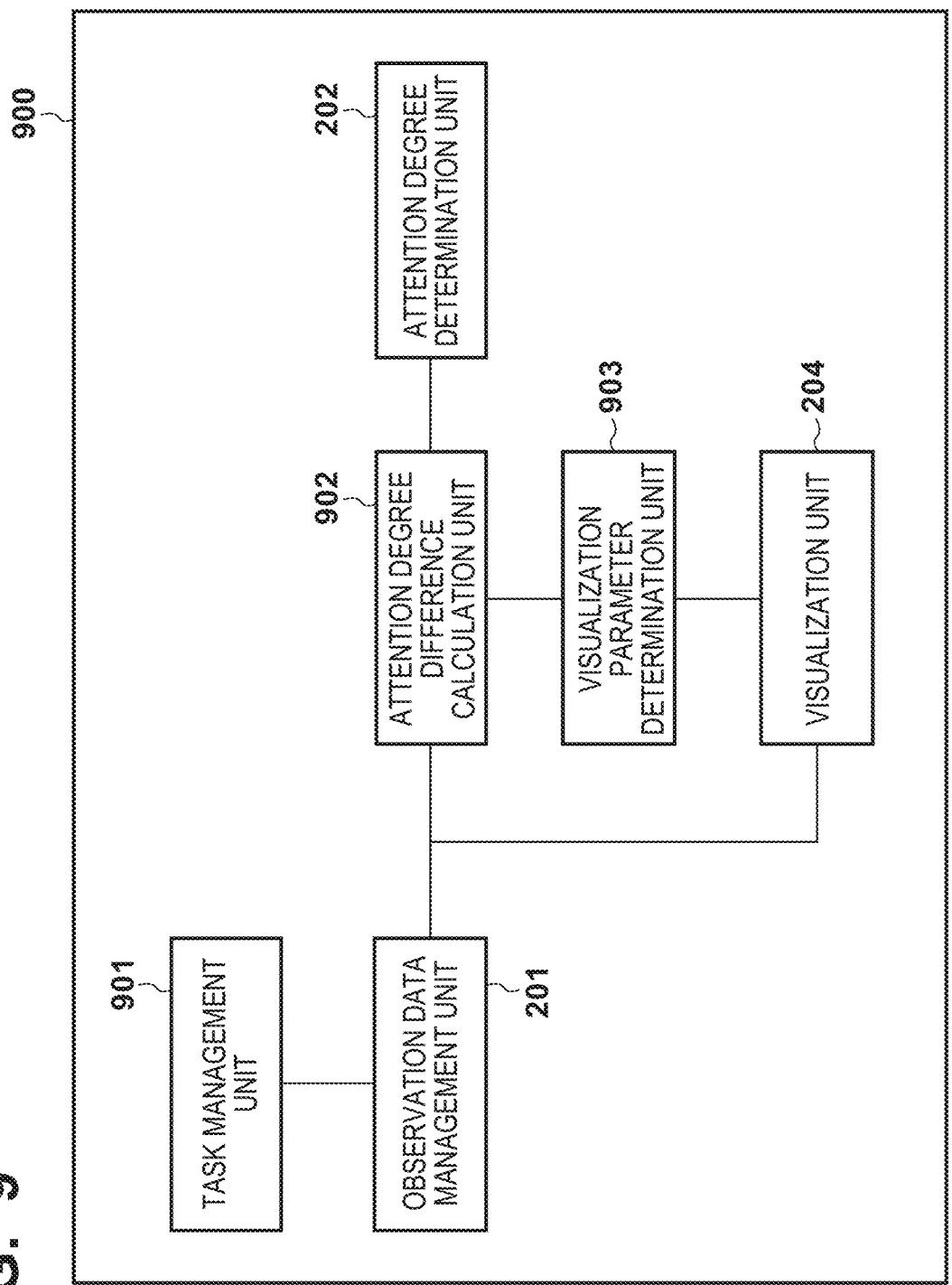
FIG. 9 is a functional block diagram of an information display apparatus according to a second embodiment.

FIG. 9 is a block diagram illustrating an example of a functional configuration of an information display apparatus 900 according to the present embodiment. The information display apparatus 900 includes an observation data management unit 201, an attention degree determination unit 202, a visualization unit 204, a task management unit 901, an attention degree difference calculation unit 902, and a visualization parameter determination unit 903. Here, the observation data management unit 201, the attention degree determination unit 202, and the visualization unit 204 are the same as the corresponding reference signs in FIG. 2, and thus the description of these units will be omitted.

The task management unit 901 holds a task in HDD 104, an external recording apparatus connected via a communication unit 107, or the like. Here, the task is a work unit in which a series of observation activities is performed for a particular purpose. A specific example of the task will be described below with reference to FIGS. 10A and 10B.

The attention degree difference calculation unit 902 receives two pieces of observation data, uses the attention degree determination unit 202 to determine attention degree of each piece of observation data, and calculates a difference in the attention degree. The visualization parameter determination unit 903 determines a visualization parameter based on the attention degree difference calculated by the attention degree difference calculation unit 902.

Task Table and Observation Data Table

FIGS. 10A and 10B illustrate a task table and an observation data table. FIG. 10A illustrates a task table 1000 used by the task management unit 901 to manage a held task.

In FIG. 10A, in ID 1001 of the task table 1000, ID for uniquely identifying a task stored in the task table 1000 is described. In a date 1002, the date on which a task was performed is described. In a task type 1003, a string representing the purpose of a task is described.

Four tasks are stored in the task table 1000. A task with the ID 1001 of 1 represents that a task with the task type 1003 of "powdery mildew survey" was performed on Feb. 1, 2019. Similarly, a task with the ID 1001 of 2 represents that a task with the task type 1003 of "powdery mildew survey" was performed on Feb. 15, 2019. In addition, a task with the ID 1001 of 3 represents that a task with the task type 1003 of "sugar content survey" was performed on Apr. 6, 2019.

Similarly, a task with the ID 1001 of 4 represents that a task with the task type 1003 of "sugar content survey" was performed on Apr. 13, 2019.

Observation Data Table

FIG. 10B is an observation data table 1010 used by the observation data management unit 201 to manage held observation data. 301 to 305 are similar to those with the corresponding signs in FIG. 3 and thus description of those will be omitted.

In task ID 1011, reference ID for referring to the task stored in the task table 1000. In the illustrated example, information with the ID 301 of 1 to 3 has the task ID 1011 of 1 and involves a powdery mildew survey. Observation values observed at different observation positions (coordinates) are stored. Similarly, information with the ID 301 of 4 to 6 has the task ID 1011 of 2 and involves a powdery mildew survey. Observation values observed at different observation positions (coordinates) are stored.

Visualization Parameter Table

Figure 11:
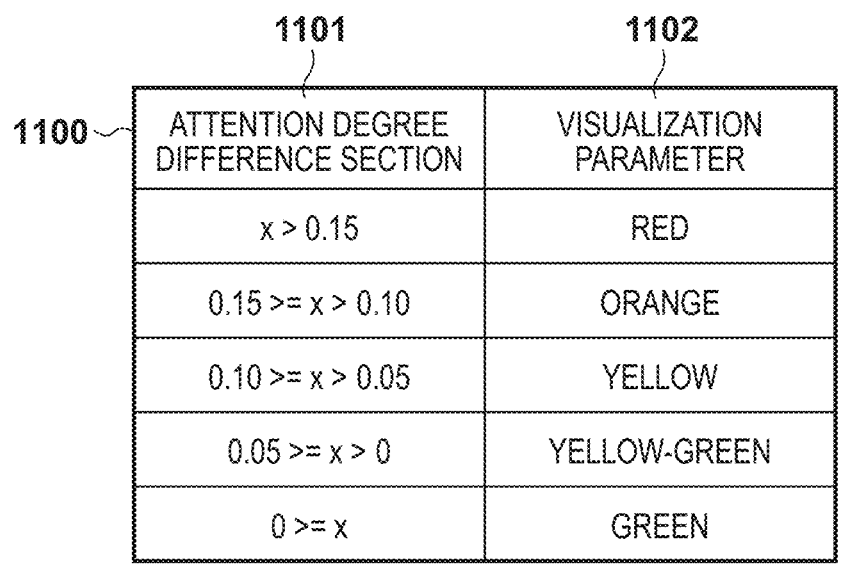
FIG. 11 illustrates a table storing a visualization parameter according to the second embodiment.

FIG. 11 illustrates a visualization parameter table 1100 that is referred to when the visualization parameter determination unit 903 determines a visualization parameter from an attention degree difference. In an attention degree difference section 1101, each section of an attention degree difference is described. In a visualization parameter 1102, a visualization parameter corresponding to the attention degree difference section 1101 is described.

In the illustrated example, in a case where an attention degree difference X is X>0.15, a visualization parameter is red, and in a case where the attention degree difference X is $0.15 \geq X > 0.10$, a visualization parameter is orange. In addition, in a case where the attention degree difference X is $0.10 \geq X > 0.05$, a visualization parameter is yellow, and in a case where the attention degree difference X is $0.05 \geq X > 0$, a visualization parameter is yellow-green, and in a case where the attention degree difference X is $0 \geq X$, a visualization parameter is green.

Processing

Figure 12:
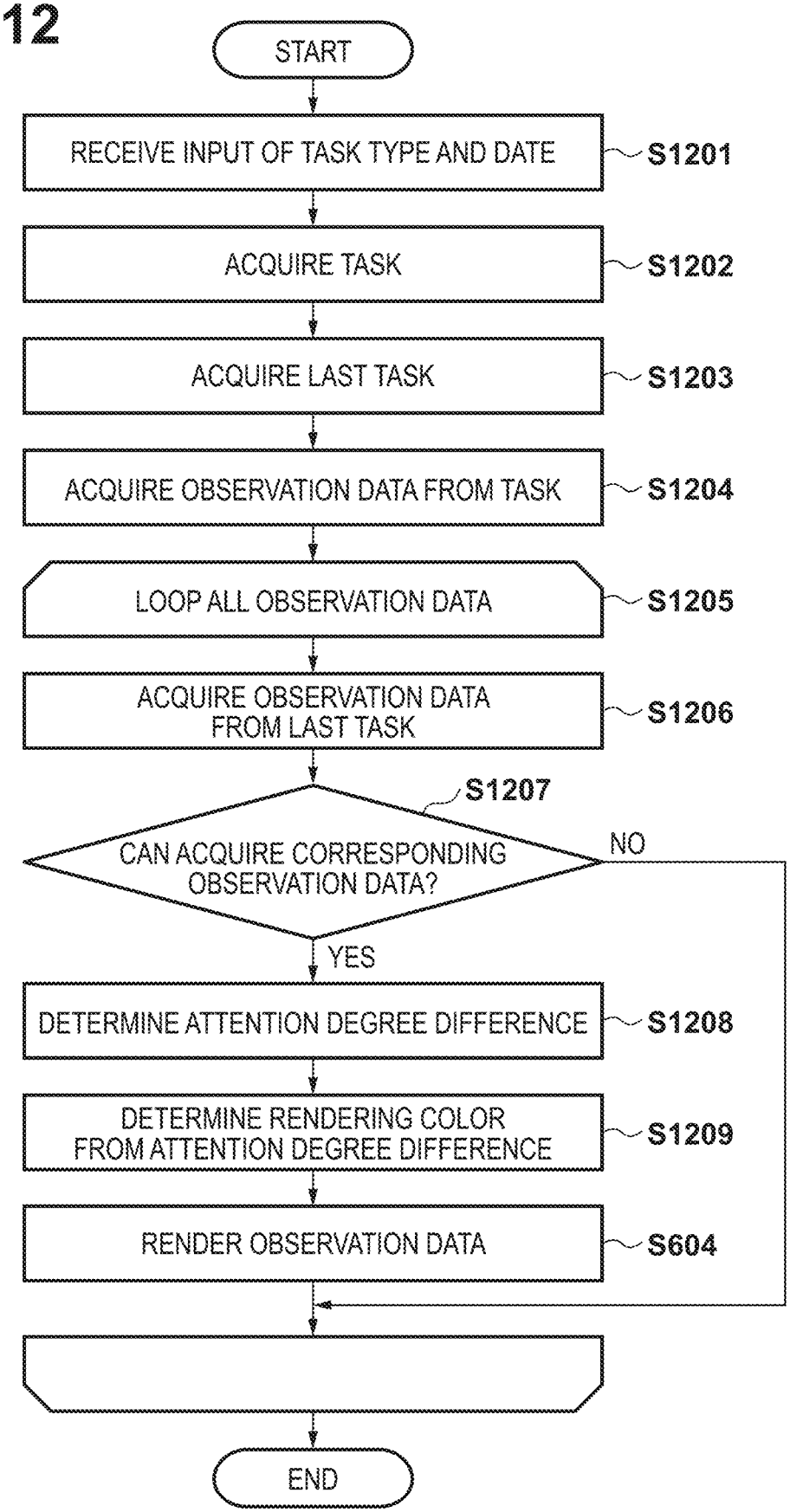
FIG. 12 is a flowchart of main processing according to the second embodiment.

FIG. 12 is a flowchart explaining a flow of the entire processing performed by the information display apparatus 900 according to the present embodiment. Processing at S604 is similar to the processing with the corresponding sign in FIG. 6, and thus description of the processing will be omitted.

At S1201, a CPU 101 causes a display unit 105 to display, in a predetermined display area, a display screen described below with reference to FIG. 13, and receives a task selection operation via an operation unit 106.

Figure 13:
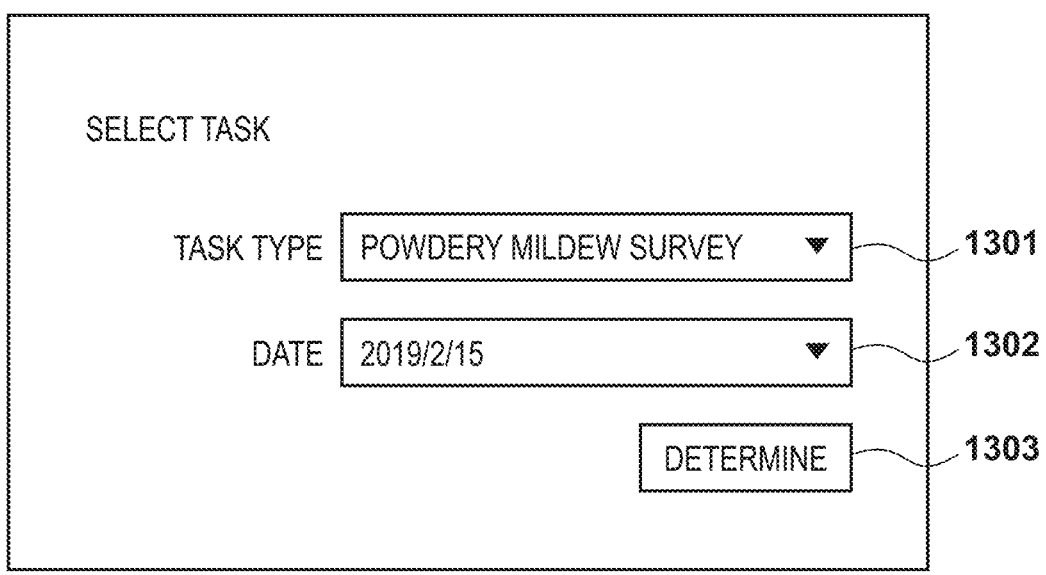
FIG. 13 is an explanatory view illustrating a screen layout of task selection according to the second embodiment.

Here, FIG. 13 is a view illustrating an example of a screen layout displayed on the display unit 105 when the task selection is received at S1201. A task type drop-down list 1301 is a drop-down list from which a task type is selected. Selection options in the task type drop-down list 1301 are obtained by acquiring all the task types 1003 of the task table 1000 in FIG. 10A and deleting overlap.

A date drop-down list 1302 is a drop-down list for selecting the date when a task was performed. Selection options in the date drop-down list 1302 are determined when the task type drop-down list 1301 is selected. The tasks stored in the task table 1000 are narrowed down by using the task type selected in task type drop-down list 1301, and the dates 1002 of the task resulting from the narrowing-down are used as selection options for the date drop-down list 1302.

An ENTER button 1303 is a button for determining to execute processing at S1202 described below, based on the items selected in the task type drop-down list 1301 and the date drop-down list 1302.

At S1202, the CPU 101 acquires a task from the task management unit 901 based on the task type and the date input at S1201. At S1203, the CPU 101 acquires the last performed task (hereinafter, referred to as the last task) for the task acquired at S1202. Specifically, a task with the latest date may be acquired from tasks having the same task type as that of the task acquired at S1202 and performed before the date of the task acquired at S1202. Note that the task may be selected by redisplaying the display screen in FIG. 13. At that time, the selection options in the task type drop-down list 1301 include only the task type of the task acquired at S1202. In addition, the selection options in the date drop-down list 1302 include only the dates before the date of the task acquired at S1202.

At S1204, the CPU 101 acquires observation data associated with the task acquired at S1202. Specifically, the observation data table 1010 illustrated in FIG. 10B may be searched by using, as a key, the ID of the task acquired at S1202. At S1205, the CPU 101 repeats the processing from S1206 to S1209 and at S604 for the observation data acquired at S1204. In the following, the observation data referred to in the current iteration is referred to as the current observation data (observation data of interest).

At S1206, the CPU 101 acquires, from among the observation data associated with the last task, corresponding observation data (hereinafter referred to as the last observation data) corresponding to the current observation data. Specifically, a distance in positional information (coordinates) between the current observation data and each piece of observation data associated with the last task is calculated, and in a case where the distance is within a predetermined range, the observation data associated with the last task is acquired.

Note that during observation (during observation data collection), the association of the observation data may be performed by manually entering the ID of the corresponding past observation data associated with the past task performed before the observation. In this case, the last observation data ID is added to the observation data table 1010. To acquire observation data corresponding to the current observation data from among the observation data associated with the last task, the observation data table 1010 illustrated in FIG. 10B may be searched by using, as a key, the last observation data ID provided in the current observation data.

In addition, ID may be assigned to a crop in advance, and during observation (during observation data collection), observation data may be associated with the crop ID. In this case, the crop ID is added to the observation data table 1010. To acquire the observation data corresponding to the current observation data from among the observation data associated with the last task, the observation data table 1010 may be searched by using, as a key, the crop ID provided in the current observation data. In a case where a plurality of pieces of observation data are searched, the observation data with the latest observation date may be selected.

At S1207, the CPU 101 determines whether the last observation data has been acquired at S1206. In a case where the last observation data has been acquired, the processing proceeds to S1208. In a case where the last observation data has not been acquired, the processing proceeds to the next iteration.

At S1208, the attention degree determination unit 202 calculates attention degree of the current observation data and attention degree of the last observation data. Then, the attention degree difference calculation unit 902 calculates an attention degree difference based on the attention degree of the current observation data and the attention degree of the last observation data. Specifically, the attention degree difference is calculated by subtracting the attention degree of the last observation data from the attention degree of the current observation data. A positive sign of the attention degree difference indicates an increase in attention degree, and a negative sign of the attention degree difference indicates a decrease in attention degree.

At S1209, the visualization parameter determination unit 903 determines a visualization parameter from the attention degree difference calculated at S1208. In the present embodiment, the observation data is visualized as a marker, and the visualization parameter is rendering color of the marker. Here, the visualization parameter is acquired with reference to the visualization parameter table 1100 in FIG. 11. Note that, instead of using a lookup table (visualization parameter table 1100) to determine the visualization parameter from the attention degree difference, a function for returning the visualization parameter by using the attention degree difference as an argument may be used.

As described above, in the present embodiment, the difference in attention degree is calculated between the observation data of interest that is associated with the task selected by a user and the corresponding observation data associated with a previously performed task, and the observation data is visualized based on the attention degree difference. Thus, observation data with attention degree significantly changed under the effect of an event having occurred between tasks can be specified easily.

MODIFICATION EXAMPLE 2-1

Note that, in the present embodiment, only the marker based on the attention degree difference is visualized, but the marker display may be switched by a user operation to the marker display based on the attention degree described in the first embodiment. In this case, a radio button is used to select either attention degree or an attention degree difference based on which a visualization parameter is determined. The radio button is displayed in a predetermined display area of the display unit 105, and a user input is received via the operation unit 106. In a case where attention degree is selected, the processing described with reference to FIG. 6 is executed, and in a case where an attention degree difference is selected, the processing described with reference to FIG. 12 is executed.

In this manner, visualization in accordance with user's intention can be achieved by receiving selection of attention degree or an attention degree difference based on which a visualization parameter is determined.

MODIFIED EXAMPLE 2-2

Note that in the present embodiment, the marker is rendered with reference to the visualization parameter based on the attention degree difference, but the marker may be rendered also with reference to a visualization parameter based on attention degree. In this case, attention degree and an attention degree difference are assigned to respective separate visualization parameters. For example, attention degree is associated with a hue such that as attention degree increases, rendering color is closer to red, whereas as attention degree decreases, rendering color is closer to blue. In addition, an attention degree difference is associated with saturation such that as an attention degree difference increases, the saturation of rendering color increases, whereas as an attention degree difference decreases, the saturation of rendering color decreases.

In this way, in a case where attention degree is high and is increased as compared to the last attention degree (attention degree difference is large), the marker is rendered in vivid red. In a case where attention degree is low and is decreased as compared to the last attention degree (attention degree difference is small), the marker is rendered in smoky blue. This enables recognition, at a first glance, of which marker has high attention degree that is higher than the last attention degree.

According to the present invention, data of interest can be specified easily from among data visualized on a map where a plurality of types of observation data can be visualized.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-147963, filed Aug. 9, 2019, which is hereby incorporated by reference herein in its entirety.

What is claimed is:

1. An information display apparatus comprising:
a memory configured to store processor-executable instructions; and
a processor configured to execute the processor-executable instructions stored in the memory to cause the information display apparatus to implement:
an acquisition unit configured to acquire observation data indicating an observation value representing a state of a crop, the observation value being associated with any of a plurality of observation types representing types of observation objects, the observation value being obtained by observing a crop; and
a display control unit configured to visualize and display information about the observation value at a position on a map where the observation has been performed, the observation value being indicated by the observation data acquired by the acquisition unit, wherein
when the display control unit displays the information about the observation values respectively associated with the plurality of observation types simultaneously or in a switchable manner, in a case where the display control unit visualizes the information about the observation value exceeding or less than a predetermined value specified for each of the plurality of observation types, the display control unit visualizes and displays the information about the observation value on the map by using an identical display form for each of the plurality of observation types.

2. The information display apparatus according to claim 1, wherein the processor is configured to execute the processor-executable instructions stored in the memory to cause the information display apparatus to further implement an attention degree determination unit configured to determine an attention degree of the observation data as the information about the observation value based on the observation type and the observation value, and
wherein the predetermined value is a value at which the attention degree exceeds a predetermined threshold for each of the plurality of observation types.

3. The information display apparatus according to claim 1, wherein, when the display control unit displays the information about the observation values respectively associated with the plurality of observation types simultaneously or in a switchable manner, in a case where the display control unit visualizes the information about the observation value exceeding or less than a predetermined value specified for each of the plurality of observation types, the display control unit visualizes and displays the information about the observation value on the map by using identical hue, identical saturation, identical color density, an identical size, or an identical shape regardless of the observation type.

4. The information display apparatus according to claim 1, wherein the predetermined value is specified based on a chronological change in the observation value for each of the plurality of observation types.

5. The information display apparatus according to claim 1, wherein, when the display control unit displays the information about the observation values respectively associated with the plurality of observation types simultaneously or in a switchable manner, in a case where the display control unit visualizes the information about the observation value of interest for each of the plurality of observation types, the display control unit visualizes and displays the information about the observation value on the map by using an identical display form regardless of the observation type.

6. The information display apparatus according to claim 1, wherein the processor is configured to execute the processor-executable instructions stored in the memory to cause the information display apparatus to further implement an attention degree determination unit configured to determine an attention degree of the observation data as the information about the observation value based on the observation type and the observation value,
 wherein the display control unit visualizes and displays the information about the observation value on the map by using a display form corresponding to the attention degree regardless of the observation type.

7. The information display apparatus according to claim 1, wherein the observation data includes the observation type, the observation value, and an observation position representing a position where the observation has been performed,
 wherein the processor is configured to execute the processor-executable instructions stored in the memory to cause the information display apparatus to further implement:
 an attention degree determination unit configured to determine an attention degree of the observation data based on the observation type and the observation value; and
 a visualization parameter determination unit configured to determine, based on the attention degree, a visualization parameter used for visualizing the observation data, and
 wherein the display control unit causes the information about the observation value visualized in accordance with the visualization parameter to be displayed on the map.

8. The information display apparatus according to claim 7, wherein the attention degree determination unit determines the attention degree based on a learned model generated by machine learning.

9. The information display apparatus according to claim 7, wherein the observation data includes a plurality of pairs of the observation type and the observation value for one observation position,
 the processor is configured to execute the processor-executable instructions stored in the memory to cause the information display apparatus to further implement a selection unit configured to select, from the plurality of pairs, an observation type and an observation value used as representatives, and
 the attention degree determination unit determines the attention degree of the observation data based on the observation type and the observation value selected by the selection unit.

10. The information display apparatus according to claim 9, wherein the selection unit selects the observation type and the observation value used as representatives based on predetermined priority for the observation types.

11. The information display apparatus according to claim 7, wherein the processor is configured to execute the processor-executable instructions stored in the memory to cause the information display apparatus to further implement a selection unit configured to select representative observation data used as a representative from a group including a plurality of pieces of observation data, and
 wherein the attention degree determination unit determines the attention degree of the representative observation data based on an observation type and an observation value of the representative observation data.

12. The information display apparatus according to claim 11, wherein the visualization parameter determination unit determines, based on the attention degree, a visualization parameter used to visualize the representative observation data, and
 the display control unit visualizes the representative observation data on the map based on the observation position of the representative observation data and the visualization parameter.

13. The information display apparatus according to claim 11, wherein the selection unit selects the representative observation data based on an observation date of the observation data provided in the group or an observation position provided in the observation data provided in the group.

14. The information display apparatus according to claim 7, wherein the processor is configured to execute the processor-executable instructions stored in the memory to cause the information display apparatus to further implement:
 an acquisition unit configured to acquire past corresponding observation data corresponding to observation data of interest; and
 a calculation unit configured to calculate a difference in attention degree based on attention degree of the observation data and attention degree of the corresponding observation data, and
 wherein the visualization parameter determination unit determines a visualization parameter used to visualize the observation data based on the difference in attention degree.

15. The information display apparatus according to claim 14, wherein the processor is configured to execute the processor-executable instructions stored in the memory to cause the information display apparatus to further implement a reception unit configured to receive a selection between determination by the visualization parameter determination unit of a visualization parameter based on the attention degree and determination by the visualization parameter determination unit of a visualization parameter based on the difference in attention degree.

16. The information display apparatus according to claim 14, wherein the visualization parameter determination unit determines a first visualization parameter based on the attention degree and determines a second visualization parameter based on the difference in attention degree, and
 the display control unit visualizes the observation data based on the observation position, the first visualization parameter, and the second visualization parameter.

17. The information display apparatus according to claim 16, wherein the first visualization parameter is hue and the second visualization parameter is saturation.

18. The information display apparatus according to claim 7, wherein the visualization parameter is a rendering color of a marker indicating the observation data, a size of a marker, or degree of deformation of a shape of a marker.

19. A method for controlling an information display apparatus, the method comprising:
 acquiring observation data indicating an observation value representing a state of a crop, the observation value being associated with any of a plurality of observation types representing types of observation objects, the observation value being obtained by observing a crop; and
 performing display control to visualize and display information about the observation value at a position on a map where the observation has been performed, the observation value being indicated by the observation data acquired by the acquiring, wherein
 in the performing display control, when the information about the observation values respectively associated with the plurality of observation types are displayed simultaneously or in a switchable manner, in a case of visualizing the information about the observation value exceeding or less than a predetermined value specified for each of the plurality of observation types, the information about the observation value is visualized and displayed on the map by using an identical display form for each of the plurality of observation types.

20. A non-transitory computer-readable storage medium storing a computer program for causing a computer to execute a method for controlling an information display apparatus, the method comprising:

acquiring observation data indicating an observation value representing a state of a crop, the observation value being associated with any of a plurality of observation types representing types of observation objects, the observation value being obtained by observing a crop; and performing display control to visualize and display information about the observation value at a position on a map where the observation has been performed, the observation value being indicated by the observation data acquired by the acquiring, wherein in the performing display control, when the information about the observation values respectively associated with the plurality of observation types are displayed simultaneously or in a switchable manner, in a case of visualizing the information about the observation value exceeding or less than a predetermined value specified for each of the plurality of observation types, the information about the observation value is visualized and displayed on the map by using an identical display form for each of the plurality of observation types.

* * * * *